(12) United States Patent
Kao et al.

(10) Patent No.: US 7,467,302 B2
(45) Date of Patent: Dec. 16, 2008

(54) SECURE CONNECTION MECHANISM CAPABLE OF AUTOMATICALLY NEGOTIATING PASSWORD BETWEEN WIRELESS CLIENT TERMINAL AND WIRELESS ACCESS TERMINAL

(75) Inventors: Yueh-Feng Kao, Hsinchu (TW);
Chiung-Hui Wang, Hsinchu (TW);
Ming-Hao Chou, Hsinchu (TW);
Yuan-Yu Peng, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 753 days.

(21) Appl. No.: 10/991,364

(22) Filed: Nov. 19, 2004

(65) Prior Publication Data

US 2006/0129836 A1 Jun. 15, 2006

(51) Int. Cl.
*H04L 9/32* (2006.01)

(52) U.S. Cl. .................. 713/183; 713/153; 713/171
(58) Field of Classification Search ............. 713/171, 713/184, 153
See application file for complete search history.

(56) References Cited

U.S. PATENT DOCUMENTS

2004/0073795 A1* 4/2004 Jablon ................... 713/171

OTHER PUBLICATIONS

Airstation One-Touch Secure System (AOSS), Buffalo Technology, Oct. 2004.*
Broadcom: Simplifying Home Setup, Eric Griffith, May 3, 2004.*
* cited by examiner

*Primary Examiner*—Andrew L Nalven
(74) *Attorney, Agent, or Firm*—WPAT, P.C.; Justin King

(57) ABSTRACT

The present invention is to provide a secure connection mechanism capable of automatically negotiating password between a wireless client terminal and a wireless access terminal, wherein the wireless client terminal is provided with an application software, a control button and an output device. When the wireless client terminal is actuated and the control button is triggered, the secure connection mechanism is enabled by performing the steps of showing a prompt on the output device to instruct user to turn a switch button on the wireless access terminal to a secure connection mode and connecting the wireless client terminal with the wireless access terminal to establish an encryption/decryption mechanism for automatically negotiating a password required for the connection within a predetermined period through the encryption/decryption mechanism in a wireless communication way after being in the secure connection mode.

9 Claims, 3 Drawing Sheets

SECURE CONNECTION MECHANISM CAPABLE OF AUTOMATICALLY NEGOTIATING PASSWORD BETWEEN WIRELESS CLIENT TERMINAL AND WIRELESS ACCESS TERMINAL

BACKGROUND OF THE INVENTION

The present invention relates to a secure connection mechanism between a wireless client terminal and a wireless access terminal, more particularly to a secure wireless connection mechanism enabling a user to establish a wireless LAN secure connection between the wireless client terminal and the wireless access terminal merely by triggering a control button provided by an application software and turning a switch on the wireless access terminal such that a password required for the connection will be obtained automatically through negotiating therebetween.

PRIOR ART OF THE INVENTION

Recently, with the rapidly developing of wireless LAN (simply referred to as WLAN) technique and increasing population of wireless LAN product, all trades and professions have been deeply experienced the following benefits brought by the wireless LAN:

(1) For mobile-worker working among offices and remote commuters desiring to contact with offices, the wireless LAN not only can save many time but also solve the problem of connecting to office's LAN in a direct access way. Thus, the connection can be established in the twinkling of an eye and the connection can be performed at any physical position within the scope of wireless LAN without looking for a network connection port or a cable, or relying on help of professionals.

(2) Workers at any location of building can hold connection at any moment through the wireless LAN and obtain on-line data so as to substantially increase efficiency and quality of work. Because of the wireless LAN, modifications of the working locations of workers and even the whole office become easier.

(3) Owing to wireless LAN, integration between new devices (such as Personal Digital Assistant (PDA) and Tablet PC) and enterprise becomes easier and more efficient. For work environments, for example, multi-story factories, warehouses, multi-story stores, sickrooms in hospitals, and restaurants, which were originally difficult to set up LANs, LAN access environments can be easily provided for them in lower cost due to the mature wireless LAN technique. The environments, for example, the outdoors, the coast, and even battlefields, will become environments that provide LAN data access while they have no LAN before.

Owing to consideration for connection security, numerous applications of wireless LAN are limited in despite of their aforementioned advantages. More especially for territories such as financial markets and government organizations that require exacting security, extremely high risk is existed if secret data are broadcasted to any person nearby through the wireless LAN. Therefore, after the problem of connection security in the first generation of wireless LAN is found, every LAN group and security institution tries to solve the problem. Institute of Electrical and Electronic Engineers (IEEE) in USA and many standard physical alliances positively try to redefine and improve security standard of wireless LAN so as to provide consumer or enterprise with higher confidence to dispose and use wireless LAN.

Thereafter, according to the standards opened by the associations, such as IEEE, IETF and Wi-Fi Alliance, Microsoft Corporation provides two wireless LAN solutions, one of which is "Securing Wireless LANs—A Window Server 2003 Certificate Services Solution" that uses public key certificate to verify user and computer that utilize the wireless LAN, and the another of which relates to "Utilizing PEAP and Password to ensure the Security of Wireless LAN" that uses simple user name and password. Although these two solutions have very similar basic schemes and both of which are based on Microsoft Windows Server 2003 and client terminal of Microsoft Windows XP and Microsoft Pocket PC 2003, they have different target groups, wherein "Securing Wireless LANs—A Window Server 2003 Certificate Services Solution" mainly aims at large-scale organizations that requires very complicated information technique. The second solution that relates to "Utilizing PEAP and Password to ensure the Security of Wireless LAN" aims at small-scale organizations, such that the small-scale organization can easily dispose wireless LAN. The aforementioned difference does not mean that large-scale organizations cannot use password for verification or verification of certificate isn't suitable for small-scale organizations. It just means that certain specific technologies can possibly apply to certain organizations. In an example of Pre-Shared Key (PSK) stipulated in a protocol namely "Wi-Fi Protected Access (WPA)" made by Wi-Fi Alliance, the technique involved therein is more suitable for family, mini scale enterprise and office.

In general, the security issue is not as important as nowadays when the first IEEE 802.11 wireless standard is formulated, and level of security threat and complexity are lower than the present. The accepting degree of the general user and enterprise just in the stage of initial trying, and the accompanying security plan for first generation of wireless LAN, which is referred to Wired Equivalent Privacy (WEP), also underestimates the complexity of wireless security, which is classified to equal to the measurement standard of wired security. Thus, it does not satisfy practical requirements. After all, modern wireless LAN security plan should be designed to aim at insecure work environment that has no clear LAN physical. In general, the dynamic resetting of WEP is still secure for most purposes, but having the following problems:

(1) WEP utilizes different static key to perform global broadcast such as broadcast packet such that hacker may find out information, for example, IP address, computer name, and user name, that relate to LAN.

(2) The LAN framework that is protected by WEP does not have completed protections such that hacker may utilize password-compiling technique to modify information in the wireless LAN framework and renew check value for integrity in the framework.

(3) With progress of transmission speed of wireless LAN and improvement of operation ability and password-compiling technique, the WEP key needs to be minutely renewed that might cause a loading that RADIUD server cannot bear.

In order to solve the aforementioned problem, IEEE develops a new wireless security standard, which is referred to as 802.11i (also named as "robust security LAN (RSN)"). The previous 802.11i version issued by Wi-Fi alliance, which is composed of leading factories of Wi-Fi territory, is compatible with WPA (Wi-Fi Protected Access) of a standard specification. WPA includes large-scale subsets and, through issuing of WPA, Wi-Fi alliance can ask all equipments, which are labeled as Wi-Fi, to comply with WPA, and allow factories of Wi-Fi LAN hardware providing standardized high security options. WPA congregates methods that are under the impression that can ensure wireless LAN security, which mainly comprises two modes. One mode utilizes 802.1X and RADIUS verifications (simply referred to as WPA). The another mode is a simpler plan that utilizes pre-shared key and is suitable for SOHO environment (simply referred to as WPA-PSK). WPA combines powerful encryption functions with enhanced verification and authorization mechanisms that comply with 802.1X. WPA is able to provide the following functions for data protection so as to eliminate the aforementioned problems of WEP.

(1) Every packet utilizes a unique encrypted key.

(2) Longer initialization vector is utilized such that an additional 128 bit key data is added to efficiently increase key space.

(3) A signed message integrity check value that cannot be easily modified and cheated is newly added.

(4) An encrypted framework counter is incorporated so as to obstruct attack during re-execution.

Since the utilized encryption algorithm is similar to WEP that is used by user, it can be applied to existed hardware. In addition, the WPA-PSK mode allows small-scale organizations and home workers for using the pre-shared key in a condition that has no static WEP loophole. WPA that mainly uses RADIUS is identical with dynamic WEP. Individual encrypted key is generated in accordance with each wireless client terminal. Pre-shared key is used as a certificate for verification. Thus, if the user owns the key, then he is authorized to use wireless LAN and receive a unique encrypted key to protect data. The pre-shared key used in WPA not only provides a fundamental structure for small organizations under very low price, but also provides a very good level of security supported by many hardware.

But, both WEP and WPA require the related setting of index, password, or the like, which is inputted by user. Since it is inconvenient and not easy for most users to memorize password and perform complicated setting procedure, numerous users cannot get faultless protection because security mechanism is not enabled due to laziness or insufficient ability after the wireless LAN is set.

SUMMARY OF THE INVENTION

In view of the aforementioned wireless LAN security mechanism which needs the complicated setting procedure, the inventor has been made sustained researches and experiments to eventually develop a secure connection mechanism capable of automatically negotiating password between a wireless client terminal and a wireless access terminal of the present invention and to solve the aforementioned drawbacks of the prior art. It is expected that the password will be obtained by automatic negotiation if the user performs the simple actuation operation on the wireless client terminal and the wireless access terminal respectively, and therefore user does not need to perform complicated setting operation such that the wireless LAN secure connection is accomplished.

One object of the present invention is to apply it to families, mini scale enterprises, and offices such that user does not need to memorize password and perform the complicated setting procedure either. User just needs to trigger a control button provided by application software and turn a switch on the wireless access terminal such that a password required for connection will be obtained by automatic negotiation between the wireless client terminal and the wireless access terminal so as to establish a wireless LAN secure connection therebetween.

Another object of the present invention is to utilize the properties of RSA (Rivest-Shamir-Adleman) to establish the encryption/decryption mechanism between at least one wireless client terminal and at least one wireless access terminal. The mechanism enables an application software to produce two keys, one of which is a public key for encryption, and the another one is a private key for decryption. Another set of public key and private key are assigned to the wireless access terminal, wherein the another private key is stored in the wireless access terminal and the another public key is stored in the wireless client terminal. Therefore, the wireless client terminal can utilize the another public key to encrypt the public key, which is then added into a request joint packet. The request joint packet is then transmitted to the wireless access terminal. At the moment, since only the wireless access terminal owns the another private key, thus only the wireless access terminal can decrypt the public key of the wireless client terminal. Therefore, without having the another private key, illegal persons cannot decrypt the public key of the wireless client terminal even if they has intercepted the request joint packet.

Still another object of the present invention is to enable the wireless access terminal to encrypt a password (such as a passphrase or a WEP key) by means of the public key of the wireless client terminal, and then transmit it back to the wireless client terminal through a confirmation packet. At the moment, since only the wireless client terminal owns the private key capable of decrypting the password, without having the private key illegal persons cannot decrypt the password even if they has intercepted the confirmation packet. On the contrary, the password required for wireless secure connection can be obtained after the wireless client terminal utilizes the private key to decrypt the password.

Still another object of the present invention is to automatically negotiate the password required for a WPA-PSK connection so as to establish a connection relationship, which is compatible with WPA-PSK.

The above and other objects, features and advantages of the present invention will become apparent from the following detailed description taken with the accompanying drawings.

DETAILED DESCRIPTION OF THE PREFERRED EMBODIMENT

Generally speaking, RSA algorithm is an asymmetric encryption and decryption algorithm, which is jointly developed by Rivest (Massachusetts Institute of Technology), Shamir (Weizmann Institute of Science, Israel) and Adleman (University of Southern California), of which the encryption technique enables a sender to use a public key to encrypt data and a receiver to use a private key to decrypt the encrypted data, wherein the public key can be opened to the public while the private key is known merely by the private key owner and stored in a hard disk of a computer so as to become a part of a system configuration after being generated. The kind of encryption and identity verification technology is extensively applied to network applications, such as e-mail and e-commerce, and ensures data privacy such that person other than the e-mail recipient cannot decrypt data. Thus, data integrity is secured to prevent data from being modified. Meanwhile, the sender cannot deny the fact that he has sent the message. Therefore, it has very high importance while it is applied to practice domains such as e-commerce and so forth.

Figure 1:
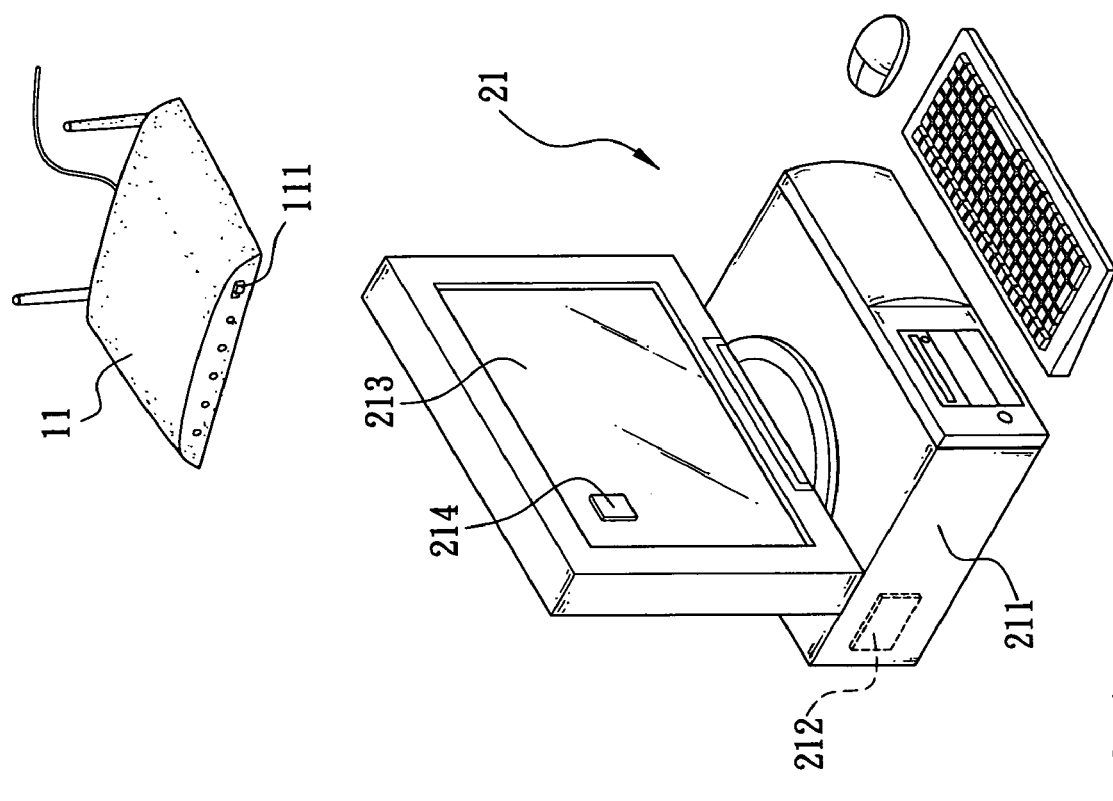
FIG. 1 is a schematic view showing a system framework of one preferred embodiment of the present invention.
Figure 1:
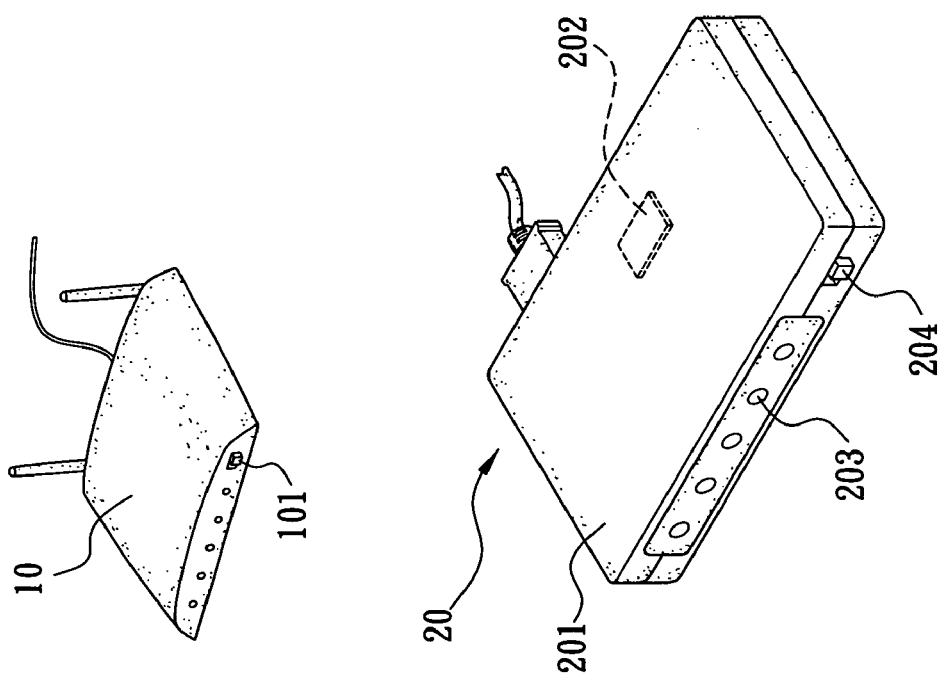

The present invention utilizes the features of RSA algorithm to design a secure connection mechanism capable of automatically negotiating password between a wireless client terminal and a wireless access terminal. The secure connection mechanism is established on at least one wireless client terminal 20 (or 21) (such as personal computer) and at least one wireless access terminal 10 (or 11) (such as wireless access point). Referring to FIG. 1, each of these wireless client terminals 20 (or 21) has a wireless transmitting and receiving module 202 (or 212) (such as wireless LAN card) such that each client terminal 20 (or 21) is able to establish a corresponding connection with each wireless access terminal 10 (or 11) in a wireless communication way through the wireless transmitting and receiving module 202 (or 212) on the wireless client terminal so as to establish an encryption and decryption mechanism which enables each of wireless client terminal 20 (or 21) to form two keys, one of which is a public key for encryption, and the another one is a private key for decryption. Another set of public key and private key is assigned to the wireless access terminal, wherein the another private key is stored in the wireless access terminal 10 (or 11), and the another public key is stored in the wireless client terminal 20 (or 21).

It is needed to note that because the another public key and the another private key assigned to the manufacturers of the wireless access terminals 10 (or 11) are different from one another, the another set of keys can be identified as a brand name of the manufacturer. As regards the public key and the private key of the wireless client terminal 20 (or 21), they are able to be generated when necessary. Alternatively, a plurality of sets of public key and private key can be pre-generated and stored in the wireless client terminal 20 (or 21) such that one set of them can be chosen for use if necessary.

Thereby, the wireless client terminal 20 (or 21) is able to utilize the another public key to encrypt its own public key and add the encrypted public key to a request joint packet, and then transmit the request joint packet to the wireless access terminal 10 (or 11). At the moment, only the wireless access terminal 10 (or 11) can decrypt the public key of the wireless client terminal 20 (or 21) since only the wireless access terminal 10 (or 11) owns the another private key. Thereafter, the wireless access terminal 10 (or 11) utilizes the decrypted public key of the wireless client terminal 20 (or 21) to encrypt a password (such as a passphrase or a WEP key), which is then transmitted back to the wireless client terminal 20 (or 21) through a confirmation packet. At the moment, because only the wireless client terminal 20 (or 21) has the private key that can decrypt the password, the encrypted password, which are necessary for wireless LAN secure connection between each other, will be obtained only when it is decrypted by the wireless client terminal 20 (or 21) by means of the private key.

According to the above description, please refer to FIG. 1 again, it is not necessary for the user to remember password and to perform the complicated setting procedure. The user only needs to trigger a control button 204 (or 214) provided on the wireless client terminal 20 (or 21), and then turn a switch button 101 (or 111) on the wireless access terminal 10 (or 11), such that the password needed for connection can be obtained by automatic negotiation between the wireless client terminal 20 (or 21) and the wireless access terminal 10 (or 11) through the above encryption/decryption mechanism. Thus, the wireless LAN secure connection between one another is rapidly established.

Figure 2:
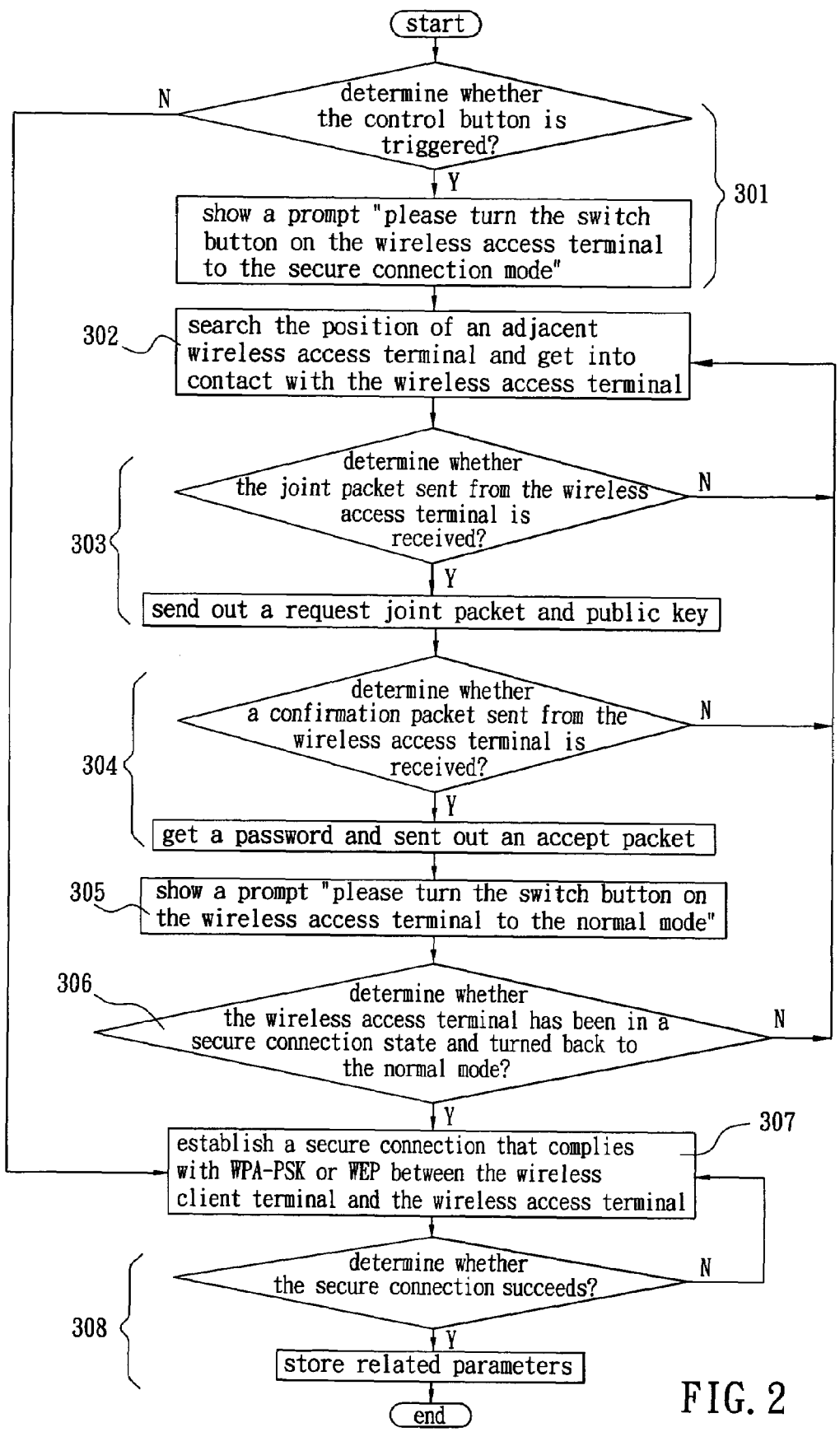
FIG. 2 is a schematic view showing a processing flow chart of wireless client terminal in accordance with the preferred embodiment of the present invention.

In one preferred embodiment of the present invention, referring to FIG. 1, the wireless client terminal 20 (or 21) is provided with an application software, the control button 204 (or 214) and an output device 203 (or 213). When the wireless client terminal 20 (or 21) is turned on and the control button 204 (or 214) is triggered, the wireless client terminal 20 (or 21) executes the application software installed therein and performs the following processing steps, as shown in FIG. 2:

(301) Firstly, determine whether the control button 204 (or 214) is triggered or not; if yes, the output device 203 (or 213) outputs a prompt to instruct user to actuate the wireless access terminal 10 (or 11) and turn the switch button 101 (or 111) to the secure connection mode so as to perform the step (302); if not, then go to the step (307) when the secure connection mechanism between the wireless client terminal 20 (or 21) and the wireless access terminal 10 (or 11) is established.

(302) Search the position of an adjacent wireless access terminal 10 (or 11), and get into contact with the wireless access terminal 10 (or 11) that is in the secure connection mode.

(303) Determine whether a joint packet sent from the wireless access terminal 10 (or 11) is received, if yes, use the another public key stored in the wireless client terminal 20 (or 21) to encrypt the public key, which is then attached to a request joint packet that will be transmitted to the wireless access terminal 10 (or 11). Then, go to the step (304). Otherwise, if the joint packet sent from the wireless access terminal 10 (or 11) is not received in a predetermined period, go back to the step (302), continuing to search an adjacent wireless access terminal 10 (or 11).

(304) Determine whether a confirmation packet sent from the wireless access terminal 10 (or 11) is received, wherein the confirmation packet includes a password for secure connection. If yes, utilize the private key to decrypt an encrypted password attached in the confirmation packet for obtaining the password for wireless LAN secure connection. Thereafter, send an accept packet to the wireless access terminal 10 (or 11) so as to perform the step (305). Otherwise, if the confirmation packet sent from the wireless access terminal 10 (or 11) is not received in a predetermined period, go back to the step (302) again, continuing to search an adjacent wireless access terminal 10 (or 11).

(305) the output device 203 (or 213) outputs another prompt to instruct user to turn the switch button 101 (or 111) to the normal mode. Then, go to the following step.

(306) Determine whether the wireless access terminal 10 (or 11) has been plugged in a secure connection state and turned back to the normal mode after the wireless access terminal 10 (or 11) receives a request packet. If yes, go to the step (307). Otherwise, if the wireless access terminal 10 (or 11) rejects to plug in the secure connection state, go back to the step (302) for searching an adjacent wireless access terminal 10 (or 11).

(307) Establish a secure connection that complies with WPA-PSK or WEP between the wireless client terminal 20 (or 21) and the wireless access terminal 10 (or 11).

(308) Determine whether the secure connection that complies with WPA-PSK or WEP succeeds. If yes, then store related parameters for being used in subsequent connection. Otherwise, go back to the step (307) such that the secure connection that complies with WPA-PSK or WEP between the wireless client terminal 20 (or 21) and the wireless access terminal 10 (or 11) is retained.

Figure 3:
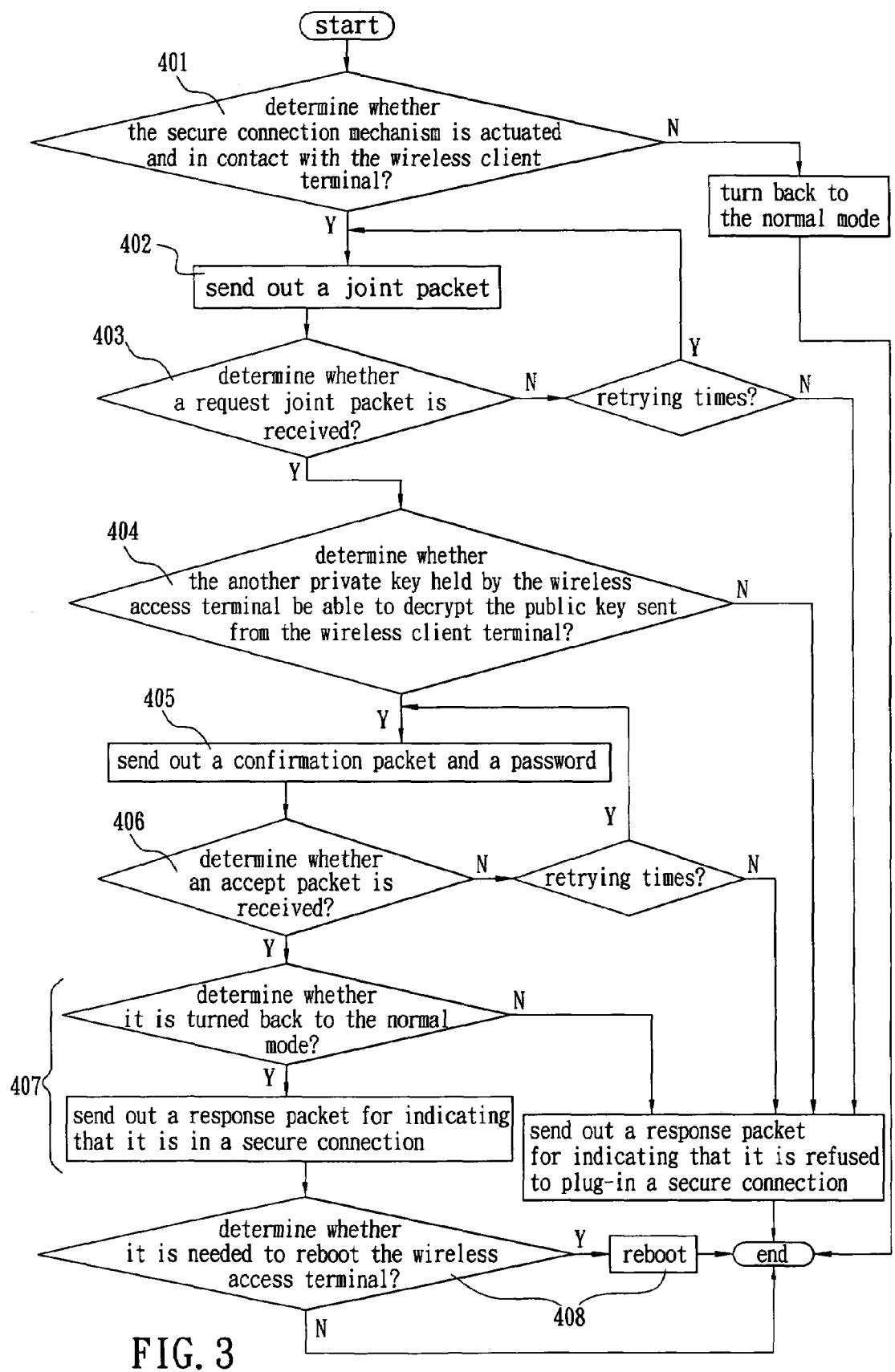
FIG. 3 is a schematic view showing a processing flow chart of wireless access terminal in accordance with the preferred embodiment of the present invention.

In the preferred embodiment, when a user turns the switch button 101 (or 111) on the wireless access terminal 10 (or 11) to the secure connection mode according to the prompt outputted by the output device 203 (or 213), the wireless access terminal 10 will actuate the secure connection mechanism to connect with the wireless client terminal 20 (or 21) according to the following steps, as shown in FIG. 3.

(401) Firstly, determine whether the secure connection mechanism is actuated and is in contact with the related wireless client terminal 20 (or 21) of which the secure connection mechanism has been actuated. If the secure connection mechanism is not actuated, or a contact with the related wireless client terminal 20 (or 21) is not established within a predetermined period, the secure connection mode is terminated so as to turn the wireless access terminal 10 (or 11) back to the normal mode. Otherwise, go to the step (402).

(402) Send out a joint packet to the related wireless client terminal 20 (or 21).

(403) Determine whether a request joint packet sent from the related wireless client terminal 20 (or 21) is received. If yes, then go to the following step (404). Otherwise, determine whether the number indicating that the request joint packet is not received exceeds a predetermined number. In the preferred embodiment, the predetermined number is three. If the number does not exceed the predetermined number, go to the step (402) for continuing to send out the joint packet to the related wireless client terminal 20 (or 21). If the predetermined number is exceeded, send a response packet out to the related wireless client terminal 20 (or 21) for indicating that it is rejected to plug-in the secure connection state.

(404) Determine whether the another private key held by the wireless access terminal 10 (or 11) be able to decrypt the public key sent from the wireless client terminal 20 (or 21). If yes, then go to the step (405). Otherwise, send a response packet out to the related wireless client terminal 20 (or 21) for indicating that it is rejected to plug-in the secure connection state.

(405) utilize the another private key to decrypt the encrypted public key and obtain the public key of the wireless client terminal 20 (or 21), and then utilize the public key to encrypt a password of a secure connection and attach the encrypted password to a confirmation packet, and send the confirmation packet out to the related wireless client terminal 20 (or 21).

(406) Determine whether an accept packet sent from the related wireless client terminal 20 (or 21) is received, wherein the accept packet denotes that the related wireless client terminal 20 (or 21) has accepted the encrypted password. If yes, then go to the step (407). Otherwise, determine whether the number for indicating that the accept packet is not received exceeds a predetermined number. In the preferred embodiment, the predetermined number is three. If the number does not exceed the predetermined number, go to the step (405) for continuing to send the confirmation packet out to the related wireless client terminal 20 (or 21). If the predetermined number is exceeded, send a response packet out to the related wireless client terminal 20 (or 21) for indicating that it is rejected to plug-in the secure connection state.

(407) Determine whether it is turned back to the normal mode. If yes, send a response packet to the related wireless client terminal 20 (or 21) denoting that the secure connection state has been plugged in. Otherwise, if the normal mode is not turned back within a predetermined period, send a response packet to the related wireless client terminal 20 (or 21) for indicating that it is rejected to plug-in the secure connection state.

(408) Determine whether it is needed to reboot. If yes, then reboot. Otherwise, the operation is completed.

It is needed to specially clarify that the switch button 101 (or 111) mounted on the wireless access terminal 10 (or 11) of the aforementioned embodiment is merely one preferred embodiment of the present invention. However, in the practical application, the present invention is not limited hereto, any person who skilled in the art may modify the switch button by means of other software, hardware, or combination thereof For example, the switch button may be modified as an adapter for receiving a connector of an Ethernet line (RJ-45). Therefore, when the connector of the Ethernet line (RJ-45) is plugged out of the adapter of the wireless access terminal 10 (or 11), the wireless access terminal 10 (or 11) is set to the secure connection mode. On the contaray, when the connector of the Ethernet line is plugged into the adapter of the wireless access terminal 10 (or 11), the wireless access terminal 10 (or 11) is set to the normal mode, and the purpose of switching between different modes is achieved.

In addition, the wireless client terminal 20 (or 21) mentioned above may be a personal computer 211 having a wireless network card, a wireless LAN printer server 201 or a wireless game adapter etc. installed therein. The wireless access terminal 10 (or 11) mentioned above may be a wireless hub, a wireless access point, a wireless router or a wireless gateway etc. Therefore, in case the wireless client terminal 21 is a personal computer 211, the output device 213 should be a display, such as a liquid crystal display, and the control button 214 should be an icon or button shown on the display. In case the wireless client terminal 20 is a wireless LAN printer server 201, the output device 203 should be an illuminating element, such as a light emitting diode (LED), and the control button 204 should be a switch disposed on the printer server.

Further, in case the output device 213 is a display, the prompt shown on the display may be an information comprising words and/or drawings for instructing user to turn the switch button on the wireless access terminal to the secure connection mode, and the another prompt shown on the display may be another information for instructing user to turn the switch button back to the normal connection mode. In case the output device 203 is an illuminating element, the situation of the light illuminated from the element (such as the blinking frequency or the position thereof) can be used to indicate the status of the wireless access terminal.

As described above, between the wireless client terminal 20 (or 21) and the wireless access terminal 10 (or 11) that have wireless LAN card, the secure connection mechanism provided in the present invention enables the wireless client terminal to utilize the another public key of the wireless access terminal 10 (or 11) to encrypt its own public key within the predetermined period without having the user to operate complicated setting procedure. The encrypted public key is then added to a request joint packet. The request joint packet is then transmitted to the wireless access terminal 10 (or 11). Then, after the wireless access terminal 10 (or 11) utilizes the another private key to decrypt the encrypted public key and obtain the public key of the wireless client terminal 20 (or 21), the wireless access terminal 10 (or 11) utilizes the public key to encrypt a password which is then transmitted back to the wireless LAN terminal 20 (or 11). Finally, the wireless client terminal 20 (or 21) utilizes the produced private key to decrypt the encrypted password so as to obtain the password required for connection between the wireless client terminal 20 (or 211) and the wireless access terminal 10 (or 11), such that a secure connection therebetween is therefore established rapidly. In addition, it is difficult for Internet hackers to intercept and decrypt the public key and the password and further destroy the security of the wireless LAN within a shortly predetermined period because both of the wireless client terminal 20 (or 21) and the wireless access terminal 10 (or 11) are positioned in a handy space when the present invention is applied to families, mini scale enterprises and offices to enable the user to trigger the control button key shown on the wireless client terminal 20 (or 21) and turn the switch button 101 (or 111) of the wireless access terminal 10 (or 11) within a predetermined period for establishing a secure connection between thereof Accordingly, the secure connection mechanism of the present invention provides a simple, rapid, and secure connection mechanism for families, mini scale enterprises and offices.

While the invention has been described by means of specific embodiments, numerous modifications and variations could be made thereto by those skilled in the art without departing from the scope and spirit of the invention set forth in the claims.

What the invention claimed is:

1. A secure connection mechanism capable of automatically negotiating password between wireless client terminal and wireless access terminal, wherein the secure connection mechanism is established between at least one wireless client terminal and at least one wireless access terminal, wherein the wireless client terminal is provided with an application software, a control button and an output device, such that when the wireless client terminal is actuated and the control button is triggered, the following steps are performed so as to enable the secure connection mechanism:

the output device prompts to instruct user to turn a switch button on the wireless access terminal to a secure connection mode;

an encryption/decryption mechanism connects the wireless client terminal to the wireless access terminal with automatically negotiating a connection password within a predetermined period in a wireless communication way after being in the secure connection mode;

wherein the secure connection mechanism further comprising:

the wireless client terminal produces a first public key for encryption and a first private key from for decryption;

a second public key and a second private key are assigned to the wireless access terminal, wherein the second private key is stored in the wireless access terminal, and the second public key is stored in the wireless client terminal;

the wireless client terminal uses the second public key to encrypt the first public key and adds the encrypted first public key into a request joint packet, which is transmitted to the wireless access terminal;

the wireless access terminal uses the second private key to decrypt the encrypted first public key;

the wireless access terminal uses the first public key to encrypt a password, which is then transmitted back to the wireless client terminal though an confirmation packet;

the wireless client terminal utilizes the first private key to decrypt the encrypted password for obtaining the password required for the wireless LAN secure connection.

2. The secure connection mechanism of claim 1, wherein after the control button is triggered, the wireless client terminal performs the following steps to enable the secure connection mechanism;

determining whether the control button is actuated, if yes, showing a first prompt on the output device to instruct user to actuate the wireless access terminal and turn the switch button to the secure connection mode;

searching the position of an adjacent wireless access terminal, and getting into contact with the wireless access terminal that is in the secure connection mode;

determining whether a joint packet sent from the wireless access terminal is received, if yes, using the second public key stored in the wireless client terminal to encrypt the first public key, which is then attached to a request joint packet that will be transmitted to the wireless access terminal;

determining whether a confirmation packet sent from the wireless access terminal is received, if yes, utilizing the first private key to decrypt an encrypted password attached in the confirmation packet for obtaining the password for wireless LAN secure connection, then sending an accept packet to the wireless access terminal;

showing a second prompt on the output device to instruct user to turn the switch button on the wireless access terminal to the normal mode; and determining whether the wireless access terminal has been plugged in a secure connection state and turned back to the normal mode after the wireless access terminal receives a request packet, if yes, establishing a secure connection between the wireless client terminal and the wireless access terminal.

3. The secure connection mechanism of claim 2 wherein, when the switch button on the wireless access terminal is in the secure connection mode, the wireless access terminal performs the following steps to enable the secure connection mechanism between the wireless access terminal and the wireless client terminal:

determining whether the secure connection mechanism is actuated and is in contact with the related wireless client terminal, if the secure connection mechanism is actuated and in contact with the related wireless client terminal within a predetermined period, sending a joint packet out to the related wireless client terminal;

determining whether a request joint packet sent from the related wireless client terminal is received, if yes, utilizing the second private key to decrypt the encrypted first public key and obtain the first public key of the wireless client terminal;

utilizing the first public key to encrypt a password and attaching the encrypted password to a confirmation packet, and then sending the confirmation packet out to the related wireless client terminal;

sending a confirmation packet to the related wireless client terminal so as to confirm that the secure connection state is established and to encrypt the password of the secure connection by means of the decrypted first public key for sending the encrypted password; and determining whether an accept packet sent from the related wireless client terminal is received, wherein the accept packet denotes that the related wireless client terminal has accepted the encrypted password, if yes, then determining whether the wireless access terminal is turned back to the normal mode, if yes, sending a response packet to the related wireless client terminal denoting that the secure connection state has been plugged in.

4. The secure connection mechanism of claim 3, when the switch button on the wireless access terminal is in the secure connection mode, if the secure connection mechanism isn't actuated or isn't in contact with the wireless client terminal after the secure connection mechanism is actuated within a predetermined period, further comprises the step of sending a response packet to the related wireless client terminal for indicating that the wireless access terminal is rejected to plug-in the secure connection state.

5. The secure connection mechanism of claim 3, wherein if the wireless access terminal has determined that the request joint packet sent from the related wireless client terminal is not received, then determining whether the number for indicating that the request joint packet is not received exceeds a predetermined number, if the number does not exceed the predetermined number, then continuing to send the joint packet to the related wireless client terminal.

6. The secure connection mechanism of claim 3, wherein if the wireless access terminal has determined that the request joint packet sent from the related wireless client terminal is not received, then determining whether the number for indicating that the request joint packet is not received exceeds a predetermined number, if the number does exceed the predetermined number, then sending a response packet to the related wireless client terminal for indicating that the wireless access terminal is rejected to plug-in the secure connection state.

7. The secure connection mechanism of claim 3, wherein if the wireless access terminal has determined that the accept packet sent from the related wireless client terminal is not received, then determining whether the number for indicating that the accept packet is not received exceeds a predetermined number, if the number does not exceed the predetermined number, then sending the confirmation packet to the related wireless client terminal.

8. The secure connection mechanism of claim 3, wherein if the wireless access terminal has determined that the accept packet sent from the related wireless client terminal is not received, then determining whether the number for indicating that the accept packet is not received exceeds a predetermined number, if the number does exceed the predetermined number, then sending a response packet to the related wireless client terminal for indicating that the wireless access terminal is rejected to plug-in the secure connection state.

9. The secure connection mechanism of claim 1, wherein the secure connection mechanism between the wireless client terminal and the wireless access terminal is a WPA-PSK secure connection.

* * * * *